US010313428B2

(12) United States Patent
Banerjee et al.

(10) Patent No.: US 10,313,428 B2
(45) Date of Patent: Jun. 4, 2019

(54) MULTI-SUBNET PARTICIPATION FOR NETWORK GATEWAY IN A CLOUD ENVIRONMENT

(71) Applicant: VMWARE, INC., Palo Alto, CA (US)

(72) Inventors: Sujeet Banerjee, Bangalore (IN); Anirudh Agarwal, Bangalore (IN); Amarjeet Singh, Bangalore (IN); Sureshbabu Koyadan Chathoth, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 263 days.

(21) Appl. No.: 14/990,791

(22) Filed: Jan. 8, 2016

(65) Prior Publication Data

US 2016/0234161 A1 Aug. 11, 2016

(30) Foreign Application Priority Data

Feb. 7, 2015 (IN) .............................. 614/CHE/2015

(51) Int. Cl.
*G06F 15/177* (2006.01)
*H04L 29/08* (2006.01)
*H04L 29/12* (2006.01)
*G06F 9/455* (2018.01)

(52) U.S. Cl.
CPC .......... *H04L 67/10* (2013.01); *G06F 9/45558* (2013.01); *H04L 61/2007* (2013.01); *H04L 61/2061* (2013.01); *G06F 2009/45595* (2013.01); *H04L 61/6068* (2013.01)

(58) Field of Classification Search
CPC . H04L 41/00; H04L 61/2015; H04L 61/2061; H04L 12/4633; H04L 12/4641
See application file for complete search history.

(56) References Cited

U.S. PATENT DOCUMENTS

| 7,788,345 B1* | 8/2010 | Sukiman | H04L 29/12283 709/220 |
| 2010/0042707 A1* | 2/2010 | Zhao | H04L 61/2015 709/221 |
| 2012/0254353 A1* | 10/2012 | Baba | H04L 12/4633 709/217 |
| 2014/0006640 A1* | 1/2014 | Subramanian | H04L 41/00 709/245 |
| 2014/0010239 A1* | 1/2014 | Xu | H04L 12/4641 370/395.53 |

* cited by examiner

*Primary Examiner* — Kyung H Shin
(74) *Attorney, Agent, or Firm* — Patterson + Sheridan, LLP

(57) ABSTRACT

A network management server allocates network addresses to a network gateway connected to a public network after receiving an allocation request that specifies a number of network addresses to allocate to the network gateway. The network management server determines a first and second subnets of the public network having, respectively, first and second pools of available network addresses capable of being allocated to devices on the public network, and allocates one or more available network addresses from the first and second pools to the network gateway.

20 Claims, 5 Drawing Sheets

MULTI-SUBNET PARTICIPATION FOR NETWORK GATEWAY IN A CLOUD ENVIRONMENT

RELATED APPLICATIONS

Benefit is claimed under 35 U.S.C. 119(a)-(d) to Foreign application Serial No. 614/CHE/2015 filed in India entitled "MULTI-SUBNET PARTICIPATION FOR NETWORK GATEWAY IN A CLOUD ENVIRONMENT", filed on Feb. 7, 2015, by VMware, Inc., which is herein incorporated in its entirety by reference for all purposes.

BACKGROUND

Addresses in a private or public network (such as the Transmission Control Protocol/Internet Protocol, or TCP/IP, -based Internet) are grouped into logical subnetworks (or "subnets"). Each subnet has a finite number of IP addresses that may be assigned to network devices. Network devices assigned particular IP addresses within a subnet can communicate with one another without using a router or gateway, while communication between network devices assigned IP addresses on different subnets typically occurs by way of a gateway connected between subnets. In a virtualized cloud computing environment, network communication is enabled by access to a network gateway that is connected between the cloud-computing environment and the public (or "external") network. Such a network gateway provides various network management services (such as Network Address Translation (NAT) and firewall services) in order control incoming and outgoing network traffic (i.e., IP data packets) from and to the external network.

In order to facilitate network management, a network gateway in a cloud computing environment is assigned IP addresses from a subnet of the external network that the gateway participates in. One of the allocated IP addresses represents (for management purposes) the address of network gateway on the external network. Other IP addresses (referred to as IP addresses from the subnet's sub-allocation pool) are allocated to the gateway to facilitate specific network management services (e.g., NAT and firewall). Since cloud computing environments are becoming larger and more complex, available IP addresses in a subnet have become a scarce resource. Indeed, gateways in cloud computing environments typically use several external IP addresses in order for the gateways to implement NAT, firewall, and virtual private network (VPN) policies.

In many cloud computing environments, IP addresses can only be allocated to a cloud-based network gateway from a single sublet. Thus, when a gateway is deployed on the network, a subnet that can accommodate all IP addresses that the newly deployed gateway requires needs to be available. Further, it is often the case that an already-deployed gateway requires additional IP addresses to enable additional services to be used with the gateway. When IP addresses can only be assigned from the initial subnet, it may be the case that the initial subnet runs out of allocable IP addresses. Further, in many cloud computing environments, IP addresses allocated to a network gateway cannot be deallocated from the gateway without deallocating (i.e., removing) the gateway itself. This results in the wasting of IP addresses assigned to a gateway that does not need them, but that still needs to remain functional.

SUMMARY

According to a first embodiment, a method of allocating network addresses by a network management server to a network gateway connected to a public network is provided. The method comprises the steps of receiving an allocation request that specifies a number of network addresses to allocate to the network gateway and determining first and second subnets of the public network having, respectively, first and second pools of available network addresses capable of being allocated to devices on the public network. The method thither comprises the step of allocating one or more available network addresses from the first and second pools to the network gateway.

According to a second embodiment, a non-transitory computer-readable medium is provided, where the computer-readable medium stores instructions executable by a computer, and where the instructions, when executed, cause the computer to perform one or more aspects of the above method.

According to a third embodiment, a method of deallocating network addresses by a network management server from a network gateway connected to a public network is provided. The method comprises the steps of receiving a deallocation request that specifies a number of network addresses to deallocate from the network gateway and determining a first subnet of the public network having a first set of one or more network addresses which have been allocated to the network gateway. The method further comprises the step of deallocating one or more of the first set of network addresses from network gateway and returning the deallocated network addresses to a first address pool associated with the first subnet.

DETAILED DESCRIPTION

Figure 1:
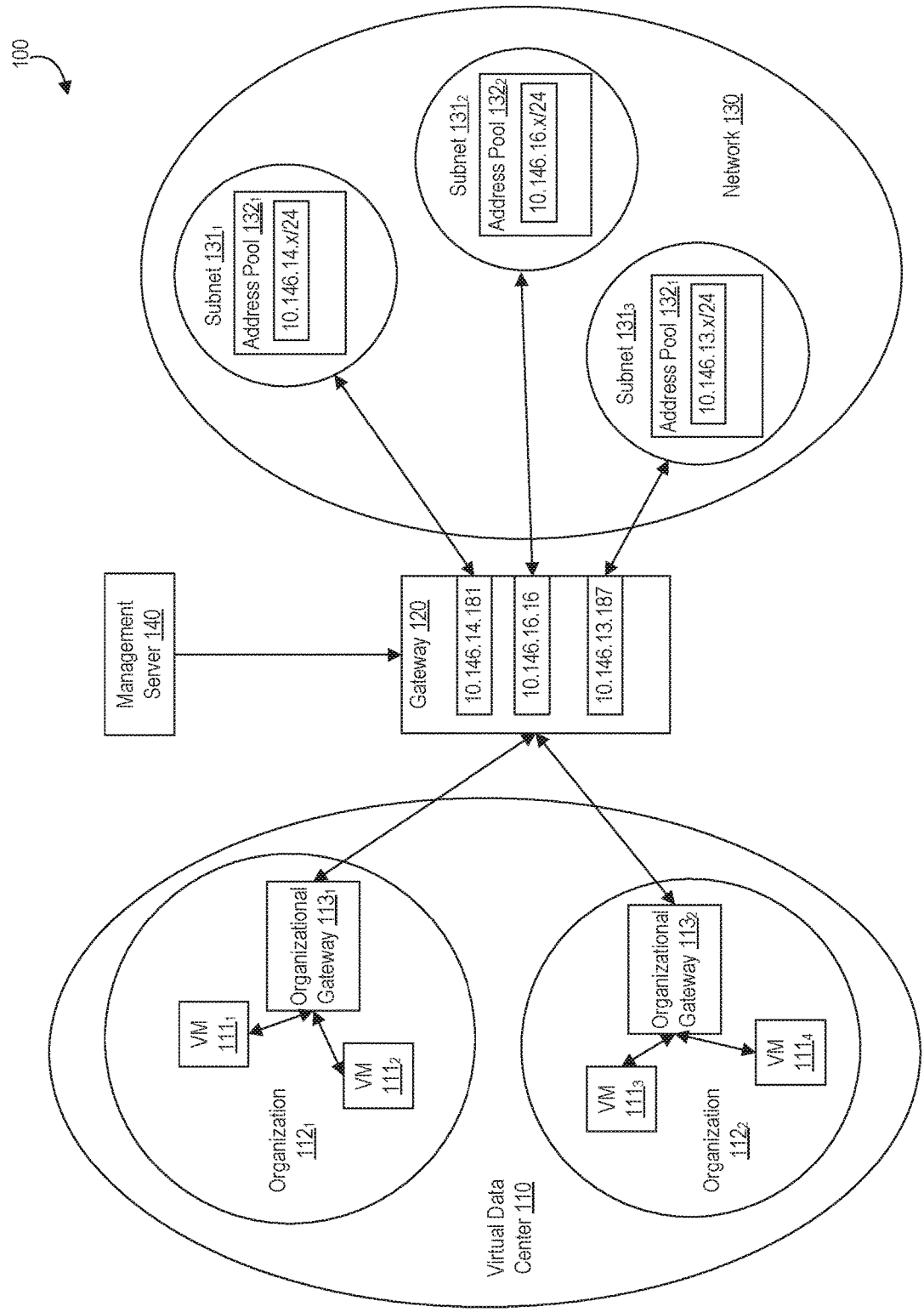
FIG. 1 is a block diagram that depicts a cloud computing environment that is in accordance with one or more embodiments.

FIG. 1 is a block diagram that depicts a cloud, computing environment 100 that is in accordance with one or more embodiments. The components depicted in FIG. 1 include a virtual data center 110, a gateway 120, an external network 130, and a management server 140. As shown, gateway 120 is connected to both virtual data center 110 and external network 130, while management server 140 communicates with gateway 120 to perform administrative tasks for cloud computing environment 100, as will be described below.

Virtual data center 110 is, in one or more embodiments, a cloud-based virtualized computing platform. Virtual data center 110 provides, among other things, data storage and application hosting for end users over a network. The components of virtual data center 110 include one or more virtual machines (VMs), which are software emulations of physical computers. The VMs provided in virtual data center 110 are configured as virtual servers that host applications that are accessible to network-based end users. For example, one or more VMs may execute applications for performing a variety of services (such as travel reservations, payment verification, and database lookups). Such applications run in a "virtualized" manner, which means that the applications execute under the control of a guest operating system in a VM. In turn, the guest operating system executes under the control of a host virtualization layer (usually referred to as a hypervisor), which executes on a physical host computer under control of a native host operating system. Thus, the hypervisor makes available to the VMs (i.e., the virtual servers) the underlying physical resources of a computer host. However, it should be noted that, in alternative embodiments, the applications executing in virtual data center 110 do not run on top of guest operating systems in VMs. Rather, in these embodiments, the applications execute inside of application "containers," which are software modules that access virtualization services of a native (rather than guest) operating system. That is, the virtualization services are provided directly by the host operating system, which eliminates the need for a guest operating system and a hypervisor.

Virtual data center 110 may be deployed in either a dedicated or virtual private cloud, in which the components of the virtualized platform of the virtual data center are hosted by a cloud provider for a "tenant" of the cloud-based system. A dedicated cloud is an instance of a single-tenant private cloud deployed within a public cloud. A virtual private cloud is a multi-tenant, logically isolated cloud service that is also deployed in a public cloud. Cloud tenants are entities that deploy applications to, and provide application services in, a cloud-computing environment. In dedicated and virtual private cloud environments, the virtualized infrastructure (e.g., the VMs in virtualized data center 110) on which the applications are deployed (as well as the physical infrastructure) are owned and managed by a cloud provider, while the cloud tenants install cloud-based application software on those VMs. In as dedicated cloud, the hardware resources utilized by a tenant are dedicated to that tenant (i.e., the resources used by a tenant are separated from the resources used by other tenants in the public cloud), whereas, in a virtual private cloud, the tenants share hardware resources.

As mentioned, dedicated and virtual private clouds are deployed in a public cloud. In a public cloud, the cloud provider deploys VMs on behalf of and for the cloud tenant. Public clouds are usually multi-tenant. Thus, the cloud provider deploys VMs at the request of several cloud tenants and is responsible for keeping the cloud tenants isolated from one another. The activities of one cloud tenant should not affect the activities of another cloud tenant. The physical infrastructure on which virtual data center 110 is deployed is not maintained on the premises of any of the cloud tenants. Rather, the physical infrastructure of a public cloud is maintained on the premises of the cloud provider. Once ATMs have been deployed to a cloud tenant, the cloud tenant then deploys applications and other cloud-based services to the deployed VMs.

In other embodiments, virtual data center 110 is deployed in a "hybrid" cloud. A hybrid cloud is a cloud computing platform in which some physical components of virtual data center 110 are maintained on the premises of the cloud tenant, while other components are maintained on the premises of a cloud provider. Such a configuration makes it possible to initially deploy a virtual data center "privately" (i.e., on the premises of a cloud tenant) and, after utilization of the virtual data center exceeds the capacity of the cloud tenant's private infrastructure, to migrate some (or all) of the virtual data center components (e.g., the VMs) to a public cloud provider. Once in a public cloud environment, the migrated components will share physical resources (e.g., host computers) that are maintained by the public cloud provider.

In the embodiment depicted in FIG. 1, virtual data center 110 is a virtualized computing environment deployed in a public cloud. That is, a public cloud provider deploys virtual data center 110 to one cloud tenant. In the figure, virtual data center 110 includes two sub-units, organization $112_1$ and organization $112_2$. Each of organizations $112_1$ and $112_2$ correspond to different organizations of the cloud tenant to which virtual data center 110 is deployed, and which are separately manageable by the cloud tenant. Each organization is created to host applications that are managed by a separate organization of the cloud tenant. Thus, organization $112_1$ may be managed by a financial group of the cloud tenant, and may host applications that provide, for example, stock quotations and financial research data. On the other hand, organization $112_2$ may be managed by a marketing group of the cloud tenant, and may host applications that provide, for example, market research data.

As shown, organization $112_1$ includes an organizational gateway $113_1$ and two VMs $111_1$ and $111_2$. In one embodiment, organizational gateway $113_1$ may be a virtualized network gateway. That is, organizational gateway $113_1$ is a software-emulated gateway. Organizational gateway $113_1$ forwards network traffic (i.e., data packets) between entities that reside outside of organization $112_1$ and entities that reside inside of organization $112_1$. Thus, organizational gateway $113_1$ receives packets from VMs $111_1$ and $111_2$ (which are, for example, application servers corresponding to organization $112_1$) and transfers those packets to VMs in another organization (e.g., organization $112_2$), to another tenant in the public cloud to which virtual data center 110 is deployed, or to a destination over an external network.

Similar to organization $112_1$, organization $112_2$ includes an organizational gateway $113_2$. Organizational gateway $113_2$ transfers data packets between entities within organization $112_2$ (such as VMs $111_3$ and $111_4$) and entities that reside outside of organization $112_2$. Entities that reside outside of organization $112_2$ to which organizational gateway $113_2$ may forward traffic include other organizations of the cloud tenant (such as organization $112_1$), other cloud tenants deployed in the public cloud, and destinations over an external network.

It should be noted that each of organizations $112_1$ and $112_2$ is depicted as having two VMs. However, this case is presented only for the purposes of illustration. Each of organizations $112_1$ and $112_2$ may contain any number of VMs as is required by the corresponding organization of the cloud tenant. Further, a cloud tenant may choose to have many more organizations deployed on its behalf by the cloud provider, or, alternatively, the cloud tenant may choose to deploy all applications (i.e., all of the tenant's VMs) in a single organizational structure. Any and all of the combinations of organizations 112, VMs 111, and organizational gateways 113 are contemplated and are within the scope of the present invention.

In addition to the organizational gateways 113 and VMs 111 that are deployed to a cloud tenant, the cloud tenant also has deployed on its behalf a gateway 120.

Gateway 120 serves as a virtual router for virtual networks deployed in the public cloud on behalf of a cloud tenant (such as the cloud tenant to which virtual data center 110 is deployed). Virtual networks are deployed to cloud tenants to enable components of (such as VMs and virtual gateways) to communicate with each other. For example, in FIG. 1, a virtual network is deployed within virtual data center 110 that enables organizational gateway $113_1$ to communicate with VMs $111_1$ and $111_2$. Gateway 120 receives data packets from an organizational gateway (such as organizational gateway $113_1$) and transmits those packets to another organizational gateway (such as organizational gateway $113_2$). In this way, gateway 120 facilitates cross-organizational communication (e.g., communication between VMs in organizations $112_1$ and $112_2$).

Gateway 120 provides a number of network-related services, such as Internet Protocol (IP) address assignment using Dynamic Host Configuration Protocol (DHCP), firewall services, Network Address Translation (NAT), static routing, virtual private network (VPN) services, and load balancing. The services performed by gateway 120 are referred to as gateway policies because the services are performed in accordance with policies established as to how network traffic is to be handled by gateway 120. As shown in FIG. 1, gateway 120 also controls incoming and outgoing network traffic that flows between virtual data center 110 and network 130. Network 130 is an external network (i.e., a network that lies external to the public cloud in which virtual data center 110 is deployed). In one or more embodiments, network 130 is a high-speed, wide-area backbone network that supports the routing and transmission of Transmission Control Protocol/Internet Protocol (TCP/IP)-based network traffic. Thus, unlike organizational gateways 113 (which only interface with virtual networks within virtual data center 110), gateway 120 interfaces with both virtual networks within virtual data center 110 and with external network 130.

When gateway 120 is instantiated (which occurs at the time that virtual data center 110 is deployed to the cloud tenant), gateway 120 is configured with one or more network addresses. According to embodiments, these network addresses are IP addresses. One of the configured IP addresses is referred to as the "gateway address," which is the IP address that represents gateway 120 in network 130. Other IP addresses are allocated to gateway 120 for use in applying one or more gateway policies. As shown in FIG. 1, the IP addresses are allocated from address pools 132, where each address pool corresponds to a subnet 131 on network 130.

Subnets 131 are logical subdivisions of network 130. Subnets 131 have a plurality of associated IP addresses, which may be thought of as being in an address pool 132. Thus, subnet $131_1$ has address pool $132_1$, subnet $131_2$ has address pool $132_2$, and subnet $131_3$ has address pool $132_3$. The pools of addresses in each address pool 132 are depicted in Classless Inter-Domain Routing (CIDR) notation. For example, address pool $132_1$ is depicted as consisting of the addresses corresponding to the address set 10.146.14.x/24. This refers to the set of IP addresses having a 24-bit address prefix 10.146.14, followed by 8 bits to identify particular network hosts (assuming 32-bit long IP addresses). Thus, address pool $132_1$ contains $2^8$ distinct IP addresses. Similarly, address pool $132_2$ consists of the address set 10.146.16.x/24, which refers to a 24-bit long address prefix 10.146.16, followed by 8 bits to identify a particular network host. Thus, address pool $132_2$ also contains $2^8$ distinct IP addresses. Finally, address pool $132_3$ contains $2^8$ distinct IP addresses, corresponding to the 24-bit address prefix 10.146.13, followed by 8 bits to identify a particular network host.

In the embodiment depicted in FIG. 1, gateway 120 is assigned three IP addresses. A first IP address (which corresponds to the gate ay IP address by which gateway 120 is identified on network 130) is allocated from address pool $132_1$ on subnet $131_1$ (i.e., 10.146,14.181). A second IP address (which corresponds to a network service, such as, for example, NAT) is allocated from address pool $132_2$ on subnet $131_1$ (i.e., 10.146.16.16). Finally, a third IP address (which corresponds to a different network service, such as, for example, firewall) is allocated from address pool $132_3$ on subnet $131_3$ (i.e., 10.146.13.187). It should be noted that each of three IP addresses signifies the participation of gateway 120 on the corresponding subnet (i.e., gateway 120 is configured to participate in multiple subnets). The participation of gateway 120 on a given subnet is used by a management server in order to properly connect gateway 120 to network 130. As will be described further herein, when an address is allocated to gateway 120, the allocated address becomes unavailable for allocation to other gateways or other cloud tenants until the allocated address is relinquished (i.e., deallocated).

It should also be noted that participation of gateway 120 in three different subnets (i.e., subnets $131_1$, $131_2$, and $131_3$) enables allocation of IP addresses from a greater number of address pools 132 than was possible in prior implementations of cloud-based virtual gateways. This is desirable in cases where a cloud tenant adds additional services and thus requires additional IP addresses above and beyond the IP addresses assigned at the time virtual data center 110 was deployed. In cases where additional IP addresses are requested by a cloud tenant, the allocation of additional IP addresses fails when the subnet 131 initially assigned to the cloud tenant (which may be shared among several cloud tenants) does not have the required additional available IP addresses.

The embodiment depicted in FIG. 1 also includes a management server 140. According to one or more embodiments, management server 140 executes on a host computer that is accessed by a system administrator to perform various cloud administration tasks. For example, management server 140 deploys virtual data center 110 to a public, private, or hybrid cloud. Management server 140 instantiates virtual networks, VMs, and organizational gateways within virtual data center 110. Management server 140 also monitors the performance of the VMs instantiated in virtual data center 110. Further, management server 140 deploys gateway 120 at the time that virtual data center 110 is deployed, and also allocates IP addresses to gateway 120 from one or More subnets 131 on network 130. While virtual data center 110 executes in a cloud computing environment, management server 140 is used by a system administrator to allocate additional IP addresses from subnets 131 to gateway 120. In addition, a system administrator may access management sever 140 to deallocate IP addresses from gateway 120 when it is determined that the IF addresses are not needed.

Figure 2A:
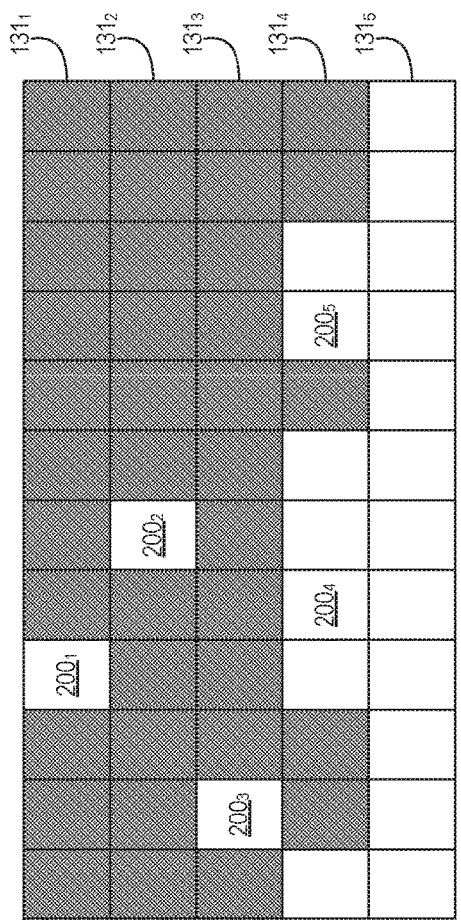
FIGS. 2A and 2B are block diagrams that depict the allocation of IP addresses from multiple subnets to a network gateway, according to one or more embodiments.
Figure 2B:
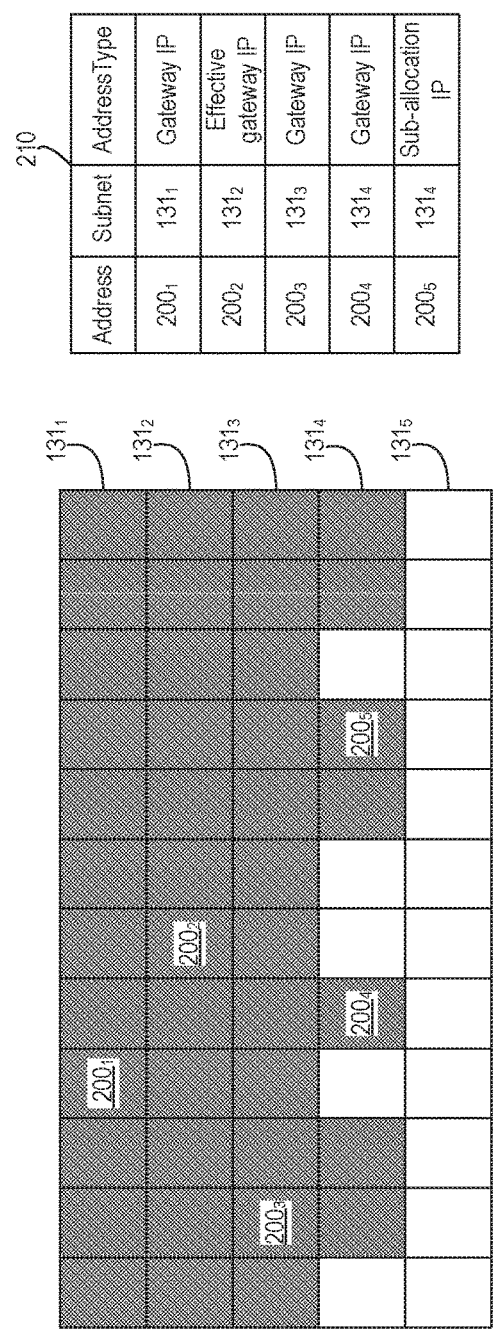

FIGS. 2A and 2B are block diagrams that depict the allocation of IP addresses from multiple subnets 131 to a gateway 120, according to one or more embodiments. As shown in the figure, each subnet 131 may be represented as a pool of addresses. Some of the IP addresses of the subnet may have already been allocated, and thus unavailable to satisfy a current request for an IP address. Other IP addresses have not been allocated (or have been relinquished by an entity to which the address was previously allocated). These IP addresses are available for allocation to satisfy a current request for an IP address.

FIG. 2A depicts (according to a conceptual representation) subnets $131_1$, $131_2$, $131_3$, $131_4$, and $131_5$. Each subnet is represented as a row in the table shown. Each IP address in a subnet 131 is represented as a box in the corresponding row for that subnet 131. A box that appears as filled by the pattern shown represents an IP address that has already been allocated to some requesting entity. Such a requesting entity may be a cloud gateway (such as gateway 120) or a network application that does not nm in the cloud, but still connects to the corresponding subnet 131. On the other hand, a box that appears as not filled by the pattern represents an available IP address, which may be used to satisfy a request for IP addresses from a gateway or other network application.

For the sake of illustration, each subnet 131 has a pool of 12 IP addresses. Prior to any requests for IP addresses, subnet $131_1$ has one free IP address $200_1$ (which is represented by the unfilled box shown in subnet $131_1$ in FIG. 2A). Likewise, each of subnets $131_2$ and $131_3$ also has one free IP address ($200_2$ and $200_3$, respectively). Subnet $131_4$, as shown, has 7 free IP addresses, among them IP addresses $200_4$ and $200_5$. Subnet $131_5$ has 12 free IP addresses, meaning that none of the IP addresses in subnet $131_5$ have been allocated.

Assuming that a request for 5 IP addresses is made by, for example, a system administrator using management server 140, the request is satisfied by management server 140 according to the allocation shown in FIG. 2B. It should be noted that the request for the additional 5 IP addresses is initiated by the system administrator for management server 140 to allocated 5 additional IP addresses to gateway 120 (as depicted in FIG. 1). The request for the 5 additional IP addresses corresponds to, for example, additional network services that are to be provided by gateway 120. For example, if gateway 120 is initially configured without a firewall or proxy server, a system administrator may decide, at a later time, to add such services. Accordingly, new IP addresses are required to be allocated for the new services. However, in the example depicted in FIGS. 2A and 2B, gateway 120 is being deployed for a cloud tenant, and 5 new gateway IP addresses are being allocated for the deployment.

As shown in FIG. 2B, management server 140 allocates the first IP address (depicted as IP address $200_1$) from the only available IP address on subnet $131_1$. Because no other available IP addresses exist in subnet $131_1$, management server 140 sets a property that indicates IP address $200_1$ represents the participation of gateway 120 in subnet $131_1$. Conceptually, this property is depicted in FIG. 2B in table 210. Table 210 is a list of IP addresses for gateway 120 that is maintained by management server 140, along with the subnet that the IP address was allocated from. Further, table 210 associates a property (an "address type") with IP address $200_1$. Management server 140 uses the table to track the IP addresses (and subnets) allocated to gateway 120 and uses this information to present a network topology to a system administrator and to manage network connectivity between gateway 120 and network 130. Thus, as shown in table 210, IP address $200_1$ is allocated from subnet $131_1$. Further, the property set for IP address $200_1$ is "gateway IP," which means that IP address $200_1$ represents (for network management purposes) the participation of gateway 120 on subnet $131_1$.

The second IP address is allocated from the only available IP address on subnet $131_2$. This is depicted in FIG. 2B as IP address $200_2$. IP address $200_2$ also represents the participation of gateway 120 on subnet $131_2$. Thus, management server updates table 210 to include an entry for IP address $200_2$. As shown in the table, IP address $200_2$ is allocated from subnet $131_2$. The property (i.e. address type) for IP address $200_2$ is set to "effective gateway IP." This setting indicates that IP address $200_2$ is the address that corresponds to gateway 120 as viewed from external networks (such as network 130). Thus, when management server 140 provides a view of the connectivity of gateway 120 to network 130, IP address $200_2$ is indicated as being the IP address for gateway 120. It should be noted that an "effective gateway IP" address also serves as an indicator that the gateway (i.e., gateway 120) participates in the corresponding subnet (i.e., subnet $131_2$).

The third IP address allocated to gateway 120 is IP address $200_3$. This address is allocated from the only available IP address in subnet $131_3$. Thus, management server 140 updates table 210 by inserting a row for IF address $200_3$. As shown, IP address $200_3$ is allocated from subnet $131_3$. Further IP address $200_3$ represents the participation of gateway 120 on subnet $131_3$ (i.e., IP address $200_3$, is the only IP address for gateway 120 on subnet $131_3$). Thus, management server 140 sets the address type properly for IP address $200_3$ to "gateway IP." Note that the property is not set to "effective gateway IP," since this property has already been set for IP address $200_2$. In this embodiment, gateway 120 may only have one effective gateway IP address.

Next, the fourth and fifth IP addresses are allocated from subnet $131_4$. This is due to the fact that none of subnets $131_1$, $131_2$, and $131_3$ has available IP addresses to satisfy the request for these IP addresses. However, since, prior to the request, subnet $131_4$ has 7 available IP addresses, the request for these last two IP addresses is satisfied from subnet $131_4$. As shown, the fourth IP address is depicted as IP address $200_4$, and the fifth IP address is depicted as IP address $200_5$. Since two addresses are allocated from subnet $131_4$, one of these addresses is selected as the address that indicates participation of gateway 120 in subnet $131_4$. Thus, management server 140 selects IP address $200_4$ as the "gateway IP" address for subnet $131_4$, and management server 140 updates table 210 to indicate that IP address $200_4$ serves this purpose.

Further, management server 140 updates table 210 by inserting a row for IP address $200_5$. Since IP address $200_5$ is not a "gateway IP" address, management server sets the address type property to "sub-allocation IP." An IP address allocated from a sub-allocation pool is an additional IP address allocated from a given sublet that is not the initially allocated subnet IP address for the gateway (i.e., the "gateway IP address"). Since gateway 120 may have multiple IP addresses allocated to it from a particular subnet, and since only one of the allocated IP addresses may serve as an indicator of the participation of gateway 120 on that subnet, the other IP addresses are classified as being allocated from a "sub-allocation pool" of the subnet.

It should be noted that the selection of IP address $200_2$ as the effective gateway IP for gateway 120, and of IP address $200_4$ as the gateway IP address for gateway 120 on subnet $131_4$ is determined at run time by management server 140. The determination is based on environmental of factors, such as network load. Thus, in another example, management server 140 may select another address (such as IP address 200$_1$) as the effective gateway IP address, and may select IP address 200$_5$ as the gateway IP address for gateway 120 on subnet 131$_4$.

Figure 3:
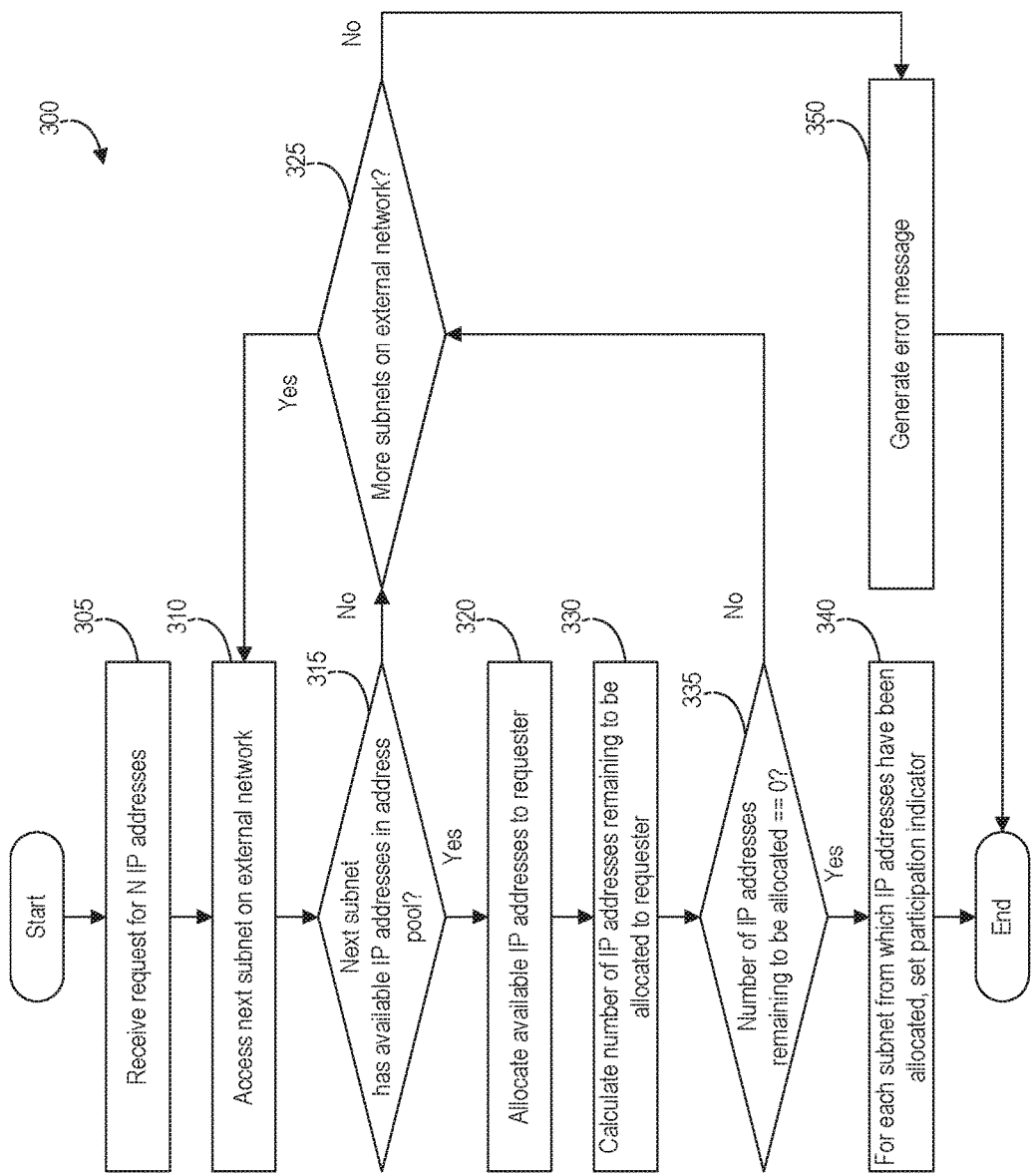
FIG. 3 is a flow diagram that depicts a method for allocating IP addresses from a plurality of subnets to a network gateway, according to one or more embodiments.

FIG. 3 is a flow diagram that depicts a method 300 for allocating IP addresses from a plurality of subnets to a cloud gateway, according to one or more embodiments. Method 300 is executed by a cloud management server, such as management server 140 depicted in FIG. 1.

Method 300 begins at step 305, where management server 140 receives a request to allocate a number (N) of IP addresses to a cloud gateway, such as gateway 120. In embodiments, management server 140 receives the request from a system administrator, where the system administrator is adding the IP addresses to a previously deployed gateway. In other cases, management server 140 receives the request as part of a deployment request for a virtual data center and cloud gateway.

At step 310, management server 140 accesses a next subnet in an external network (such as network 130) and, at step 315, determines whether there are a sufficient number of available IP addresses in the address pool of the next subnet to at least partially satisfy the request for IP addresses. If the subnet accessed at step 305 does have at least one available IP address (which can be allocated to at least partially satisfy the request), then method 300 proceeds to step 320. However, if the accessed subnet is fully allocated (i.e., no IP addresses may be allocated from the address pool of the subnet), then method 300 proceeds to step 325.

When method 300 proceeds to step 320, management server 140 allocates as many IP addresses as possible from the accessed subnet in order to satisfy the request for IP addresses. For example, if the accessed subnet has 4 free IP addresses and the request is for 5 IP addresses, then management server 140 allocates all 4 free IP addresses from the subnet's address pool. However, if the subnet has 10 free IP addresses, then management server 140 allocates all 5 IP addresses from the subnet's address pool.

Next, at step 330, management server 140 determines the number of remaining IP addresses that need to be allocated in order to fully satisfy the request. That is, if the address pool of the accessed subnet has fewer free IP addresses than the initial request, then the number of remaining IP addresses that need to be allocated is the difference between the number of IP addresses in the initial request and the number of IP addresses allocated at step 320.

At step 335, management sewer 140 determines whether the number of remaining IP addresses to be allocated is equal to zero. If there are no more IP addresses to be allocated, then method 300 proceeds to step 340. However, if there still remain IP addresses that need to be allocated, then method 300 proceeds back to step 325.

At step 325, management server 140 determines whether there are any more subnets on the external network that have address pools from which IP addresses may be allocated. If no more subnets remain, then the request for IP addresses is not fully satisfied. Hence, method 300 proceeds to step 350, where management server 140 generates an error message indicating that the request for IP addresses was not fully satisfied, or was not satisfied at all. After step 350, method 300 terminates.

However, if there are additional subnets having address pools from which IP addresses may be allocated, then method 300 proceeds back to step 310, where management server 140 accesses a next subnet. Method 300 then proceeds as before to step 315. However, at step 315, the number of IP addresses to be allocated has been reduced by the number of IP addresses allocated in the previous cycle.

Referring back to step 340 (which is reached when all requested IP addresses are allocated), management server 140 sets an indicator corresponding to one IP address in each subnet from which IP addresses have been allocated, where the indicator signifies that the corresponding IP address represents the gateway's participation in the corresponding subnet. As shown in FIG. 2B, this indicator corresponds to the "gateway IP" setting illustrated in table 210. In addition, management server 140 sets an indicator corresponding to one of the allocated IP addresses that signifies that the IP address represents the gateway itself. As shown in FIG. 2B, this indicator corresponds to the "effective gateway IP" setting illustrated in table 210.

Deallocation of IP addresses from gateway 120 is also adapted to support multi-subnet participation of gateway 120. It should be noted that, in general, IP addresses that are "in use," or, in other words, allocated to support one or more network services (such as NAT, Firewall, or VPN) cannot be deallocated from a gateway. However, an IP address that is not currently used in any gateway policy of gateway 120, and that is not the effective gateway IP address of gateway 120, can be deallocated from gateway 120. Further, from the perspective of management server 140, an IP address that is the gateway IP for a given subnet (which is not also the effective gateway IP address of gateway 120) generally cannot be deallocated until the entire subnet-participation is deleted for the gateway. An entire subnet participation for gateway 120 can be deleted when none of the gateway sub-allocation IP addresses corresponding to that subnet are being used in any gateway policies.

Figure 4A:
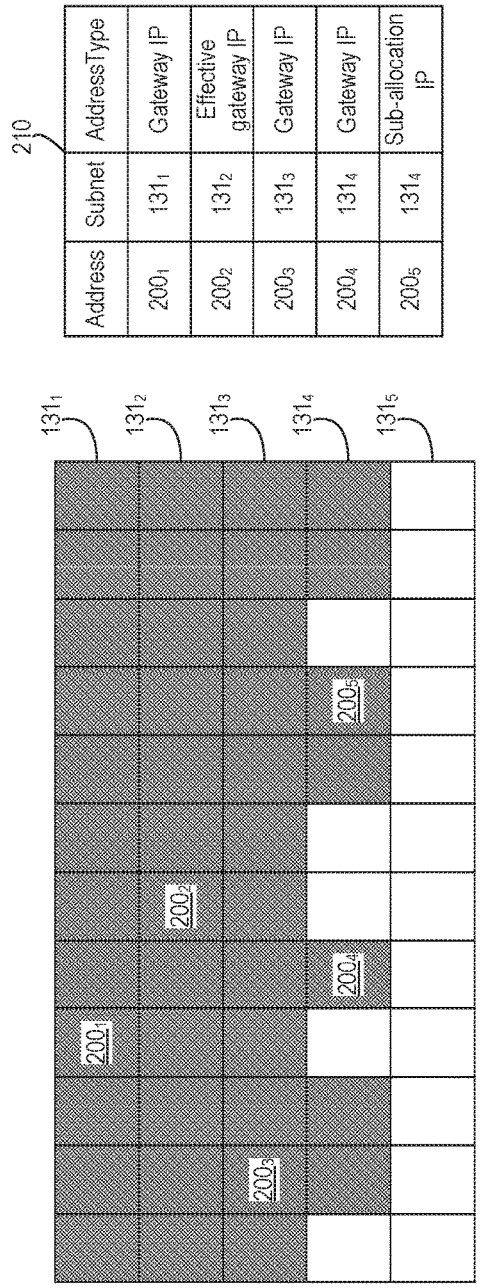
FIGS. 4A and 4B are block diagrams that illustrate deallocation of IP addresses from a network gateway, according to one or more embodiments.
Figure 4B:
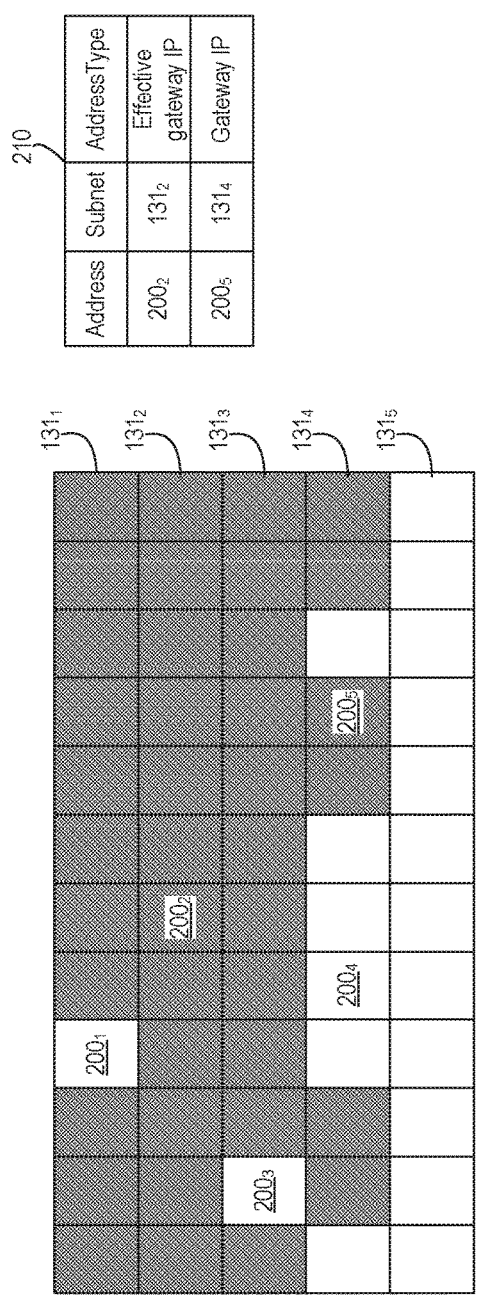

FIGS. 4A and 4B are block diagrams that illustrate the deallocation of IP addresses from a gateway, according to one or more embodiments. Deallocation of IP addresses is requested by a system administrator when the system administrator determines that the IP addresses are no longer needed by the gateway. In other cases, the deallocation of IP addresses occurs when the gateway itself is deallocated.

Figure 5:
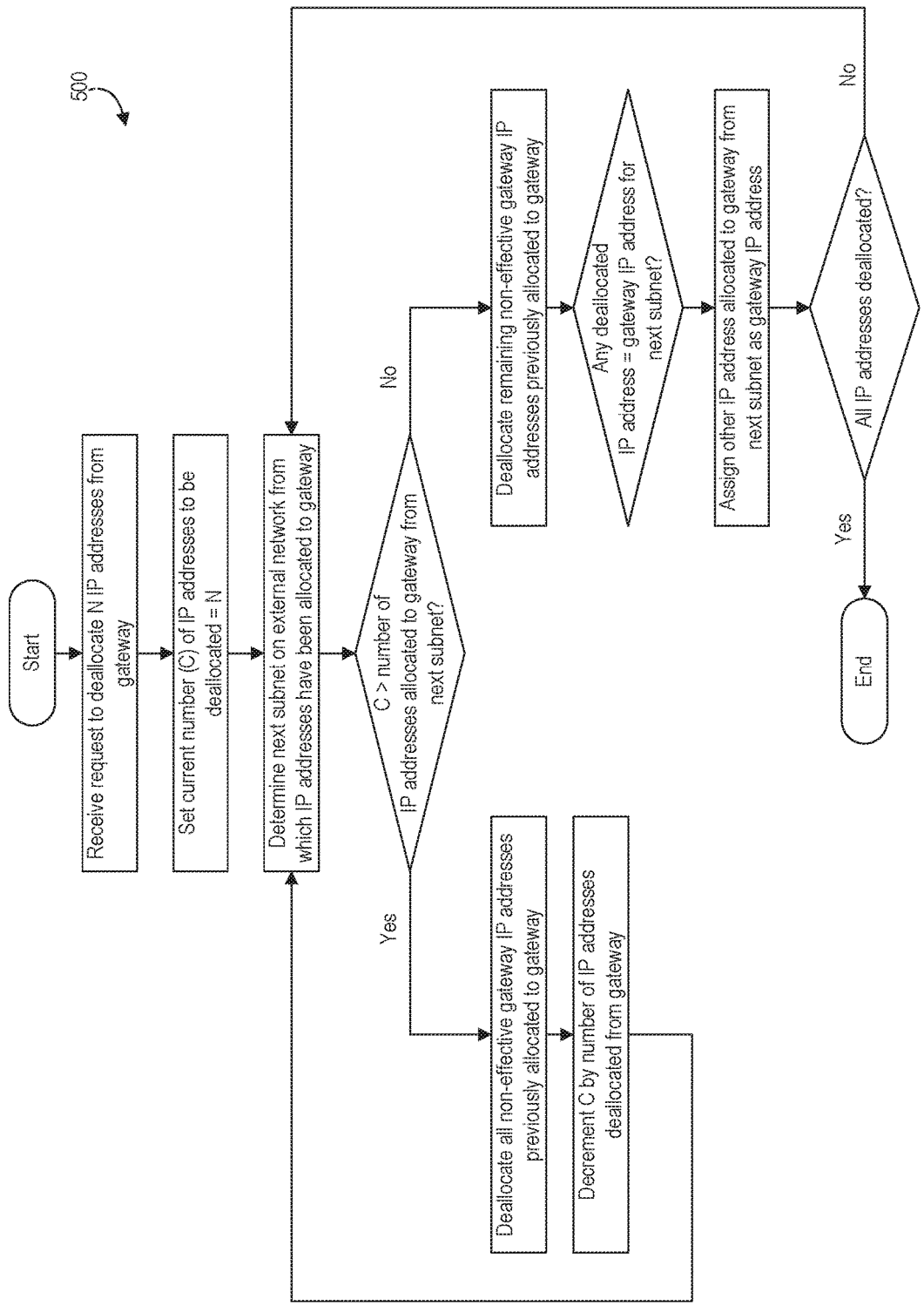
FIG. 5 is a flow diagram that depicts an embodiment of a method for deallocating a plurality of IP addresses from a network gateway and returning the deallocated IP addresses to address pools of corresponding to subnets on an external network.

As in FIGS. 2A and 2B, FIGS. 4A and 4B depict five subnets 131 (i.e. subnets 131$_1$, 131$_2$, 11$_3$, 131$_4$, and 131$_5$). These are the subnets from which the IP addresses were allocated to gateway 120, as depicted in FIGS. 2A and 2B. In FIGS. 2A and 2B, 5 IP addresses were allocated from among subnets 131$_1$, 131$_2$, 131$_3$, and 131$_4$ to gateway 120. FIGS. 4A and 4B depicts the deallocation of 3 of those previously allocated IP addresses. The deallocation is performed by management server 140. Management server 140 performs the deallocation in response to a request from a system administrator. Such a deallocation request may be made by the system administrator because the system administrator may determine that a number of IP addresses previously allocated to gateway 120 are no longer being used.

FIG. 4A depicts the allocation of IP addresses in subnets 131 prior to the deallocation request. As before, IP addresses are represented by boxes, where the rows in which the boxes reside represent subnets. Shaded boxes represent allocated IP addresses, while unshaded boxes represent unallocated IP addresses. As shown in FIG. 4A, gateway 120 has been allocated IP address 200$_1$ in subnet 131$_1$, IP address 200$_2$ in subnet 131$_2$, IP address 200$_3$ in subnet 131$_3$, and IP addresses 200$_4$ and 200$_5$ in subnet 131$_4$. As was depicted in FIG. 2B, IP addresses 200$_1$, 200$_2$, 200$_3$, and 200$_4$ each represent participation of gateway 120 in the subnet from which those IP addresses were allocated. Further, IP address 200$_2$ represents the IP address of gateway 120 itself (i.e., IP address 200$_2$ is an "effective gateway IP address").

To show this, table 210 from FIG. 2B is reproduced in FIG. 4A. As shown in table 210, IP address $200_1$ is the gateway IP address for gateway 120 on subnet $131_1$, IP address $200_2$ is the effective gateway IP address for gateway 120 on network 130 (as well as the gateway IP address for gateway 120 on subnet $131_2$), IP address $200_3$ is the gateway IP address for gateway 120 on subnet $131_3$, IP address $200_4$ is the gateway IP address for gateway 120 on subnet $131_4$, and IP address $200_5$ is a sub-allocation IP address (i.e., an address from a sub-allocation IP pool) for gateway 120 on subnet $131_4$. It should be noted that gateway 120 has not been allocated any IP addresses from the address pool corresponding to subnet $131_5$.

FIG. 4B depicts the allocation of IP addresses in subnets 131 after the request to deallocate 3 IP addresses is received and carried out by management server 140. As shown in the figure, management server 140 has deallocated IP addresses $200_1$ and $200_3$, which no longer appear as allocated from address pools of subnets $131_1$ and $131_3$. This means that, after the deallocation of these addresses, gateway 120 no longer participates in the corresponding subnets (i.e., subnets $131_1$ and $131_3$).

Further, FIG. 4B shows that IP address $200_4$ on subnet $131_4$ has been deallocated. However, since IP address $200_5$ remains allocated, management server 140 updates table 210 to indicate that IP address $200_5$ is now a "gateway IP" address, meaning that IP address $200_5$ is no longer a "sub-allocation IP" address for subnet $131_4$. Rather, IP address $200_5$ (after the deallocation of IP address $200_4$) represents the participation of gateway 120 in subnet $131_4$.

It should be noted that management server 140 does not deallocate IP address $200_2$ on subnet $131_2$. This is due to the fact that IP address $200_2$ represents the "effective gateway IP" address of gateway 120. That is, management server 140 represents gateway 120 itself as having IP address $200_2$. Deallocating IP address $200_2$ is thus equivalent to deallocating gateway 120 itself from network 130. Thus, according to embodiments, when IP addresses are deallocated from gateway 120, the effective gateway IP address is maintained as long as possible. That is, the effective gateway IP address is the last IP address to be deallocated and is only deallocated by management server 140 when management server 140 receives a request to deallocate all IP addresses associated with gateway 120.

Therefore, as shown in table 210 in FIG. 4B, the addresses that remain allocated to gateway 120 from network 130 are effective gateway IP address $200_2$ (on subnet $131_2$) and gateway IP address $200_5$ (on subnet $131_4$).

FIG. 5 is a flow diagram that depicts an embodiment of a method 500 for deallocating a plurality of IP addresses from a cloud gateway and returning the deallocated IP addresses to address pools corresponding to subnets on an external network. Method 500, in embodiments, is carried out by a network management server, such as management server 140.

As was the case for method 300, an example of a cloud gateway is gateway 120, depicted in FIG. 1.

At step 505, management server 140 receives a request to deallocate a number (N) of IP addresses from gateway 120, and to return each deallocated IP address to the address pool of the subnet that corresponds to the deallocated IP address. At step 510, management server 140 initializes a "current" number of IP addresses to deallocate from gateway 120 to the value N received in the request. This current number of IP addresses to deallocate (which is referred to herein by the symbol C) is updated (i.e., decremented) while method 500 is carried out, and represents the number of IP addresses that management server 140 has yet to deallocate to satisfy the request.

At step 515, management server 140 determines a next subnet that has an address pool from which gateway 120 has been allocated one or more IP addresses (referred to herein for the sake of brevity as the "next" subnet). For instance, referring to FIG. 4A, subnet $131_1$ would be a subnet from which an IP address has been allocated to gateway 120. However, subnet $131_5$ is a subnet from which no IP addresses have been allocated to gateway 120.

Next, at step 520, management server 140 determines whether the current number C of IP addresses that management server 140 has yet to deallocate exceeds the number of IP addresses that have been allocated to gateway 120 from the next subnet. For example, with reference to FIG. 4A, assuming the request that management server 140 receives at step 505 is for the deallocation of 5 IP addresses and that management server 140 determines that subnet $131_1$ is the "next" subnet from which one or more IP addresses have been allocated to gateway 120, then management server 140 would determine that the condition at step 520 is true because the current number of IP addresses to be deallocated (i.e., 5) exceeds the number of IP addresses allocated to gateway 120 from subnet $131_1$ (i.e., 1).

If management server 140 determines that the condition at step 520 is satisfied, then method 500 proceeds to step 525. At step 525, management server 140 deallocates all IP addresses allocated to gateway 120 from the next subnet (and returns those IP addresses to the address pool for the next subnet) provided that the address previously allocated from the next subnet is not the "effective gateway IP address" for gateway 120. That is, if any of the IP addresses allocated from the next subnet represents the participation of gateway 120 on external network 130, then that particular IP address is not deallocated and return. This is because doing so would have the effect of removing gateway 120 from network 130 altogether, while the request being processed in method 500 is to deallocate a number IP addresses from gateway 120 while gateway 120 still continues to function. Thus, if the number C indicates that 3 IP addresses are to be deallocated from gateway 120 and the next subnet has 2 IP addresses previously allocated to gateway 120, neither of which is the "effective gateway IP address" for gateway 120, then management server 140 would deallocate both IP addresses from gateway 120 and return those addresses to the address pool of the next subnet. However, if one of the IP addresses previously allocated to gateway 120 is the effective gateway IP address for gateway 120, then management server 140 would deallocate only one of the IP addresses from gateway 120 (i.e., the IP address that is not the effective gateway IP address for gateway 120).

At step 530, management server determines as new number C of IP addresses to be deallocated from gateway 120. Management server 140 performs this step by decrementing the number C by the number of IP addresses deallocated from gateway 120 at step 525. After completing step 530, method 500 proceeds back to step 515 where management server 140 determines again a next subnet (i.e., a different subnet) from which one or more IP addresses have been allocated to gateway 120.

Referring back to step 520, if management server 140 determines that the number C (indicating the current number of IP addresses to be deallocated from gateway 120) does not exceed the number of IP addresses allocated to gateway 120 from the next sublet, then method 500 proceeds to step 535. At step 535, management server 140 deallocates the number C of IP addresses remaining to be deallocated from gateway 120 in order to satisfy the deallocation request. It should be noted that if any one of the addresses allocated to gateway 120 from the next subnet is the effective gateway IP address for gateway 120, then that address is not deallocated from gateway 120. The reasoning for this is that same as set forth in the description of step 525 of the current method.

At step 540, management server 140 determines whether any of the deallocated IP addresses is a gateway IP address for gateway 120 on the next subnet. That is, management server 140 determines whether any of the deallocated IP addresses represents the participation of gateway 120 on the next subnet. If the condition at step 540 is true, then method 500 proceeds to step 545, where management server 140 reassigns an IP address that was not deallocated from gateway 120 at step 535 as a gateway IP address for gateway 120 on the next subnet. Such an IP address that was not deallocated is, in embodiments, referred to as a sub-allocation IP address for the next subnet. An example of the reassignment of a sub-allocation IP address to become a gateway IP address is depicted in FIGS. 4A and 4B, where IP address $200_5$ undergoes such an assignment.

At step 550, management server 140 decrements C by the number of IP addresses deallocated at step 535. If, at step 555, management server 140 determines that C is equal to zero (i.e., that all N IP addresses requested to be deallocated from gateway 120 have indeed been deallocated), then method 500 terminates. If C is not equal to zero, then method 500 proceeds back to step 515, where management server 140 determines a next subnet from which IP addresses have been allocated to gateway 120. In this case, method 500 may return to step 515 when one of the IP addresses allocated to gateway 120 from the next subnet is the effective gateway IP address for gateway 120 and there are no other remaining IP addresses on the next subnet to deallocate from gateway 120. Thus, in this situation, the value of C would be equal to one.

Although one or more embodiments have been described herein in some detail for clarity of understanding, it should be recognized that certain changes and modifications may he made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) —CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application rims. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of allocating network addresses by a network management server to a network gateway connected to a public network, the method comprising:
    receiving an allocation request that specifies a number of network addresses to allocate to the network gateway;
    determining first and second subnets of the public network having, respectively, first and second pools of available network addresses capable of being allocated to devices on the public network;
    allocating one or more available network addresses from the first and second pools to the network gateway; and
    associating a first indicator with a first one of the available network addresses in the first pool, the first indicator indicating that the associated network address represents participation of the network gateway in the first subnet.

2. The method of claim 1, further comprising:
    determining that the first pool has fewer available network addresses than the number of network addresses specified in the allocation request, wherein
    the allocating of the one or more network addresses from the second pool to the network gateway is carried out in response to the determining.

3. The method of claim 2, further comprising determining that one or more network addresses in the first pool have been allocated to devices other than the network gateway.

4. The method of claim 2, further comprising:
    associating a second indicator with one of the network addresses allocated from the second pool, the second indicator indicating that the associated network address represents participation of the network gateway in the second subnet.

5. The method of claim 4, further comprising:
    associating a third indicator with one of the network addresses allocated from one of the first and second pools, the third indicator indicating that the associated network address represents the network address of the network gateway on the public network.

6. The method of claim 1, further comprising:
    determining that the first and second pools have fewer available network addresses than the number of addresses specified in the allocation request; and
    in response to the determining, generating an error message that indicates that the allocation request has failed.

7. The method of claim 1, wherein the network gateway routes network traffic between the public network and one or more virtualized data centers.

8. The method of claim 1, wherein the network addresses are Internet Protocol (IP) addresses.

9. A non-transitory computer-readable medium that stores instructions executable by a computer, wherein the instructions, when executed, cause the computer to perform a method of allocating network addresses by a network management server to a network gateway connected to a public network, the method comprising:
    receiving an allocation request that specifies a number of network addresses to allocate to the network gateway;
    determining first and second subnets of the public network having, respectively, first and second pools of available network addresses capable of being allocated to devices on the public network;
    allocating one or more available network addresses from the first and second pools to the network gateway; and
    associating a first indicator with a first one of the available network addresses in the first pool, the first indicator indicating that the associated network address represents participation of the network gateway in the first subnet.

10. The computer-readable medium of claim 9, further comprising:
    determining that the first pool has fewer available network addresses than the number of network addresses specified in the allocation request, wherein
    the allocating of the one or more network addresses from the second pool to the network gateway is carried out in response to the determining.

11. The computer-readable medium of claim 10, further comprising determining that one or more network addresses in the first pool have been allocated to devices other than the network gateway.

12. The computer-readable medium of claim 10, further comprising:
    associating a second indicator with one of the network addresses allocated from the second pool, the second indicator indicating that the associated network address represents participation of the network gateway in the second subnet.

13. The computer-readable medium of claim 12, further comprising:
    associating a third indicator with one of the network addresses allocated from one of the first and second pools, the third indicator indicating that the associated network address represents the network address of the network gateway on the public network.

14. The computer-readable medium of claim 9, further comprising:
    determining that the first and second pools have fewer available network addresses than the number of addresses specified in the allocation request; and
    in response to the determining, generating an error message that indicates that the allocation request has failed.

15. The computer-readable medium of claim 9, wherein the network gateway routes network traffic between the public network and one or more virtualized data centers.

16. The computer-readable medium of claim 9, wherein the network addresses are Internet Protocol (IP) addresses.

17. A method of deallocating network addresses by a network management server from a network gateway connected to a public network, the method comprising:
    receiving a deallocation request that specifies a number of network addresses to deallocate from the network gateway;
    determining a first subnet of the public network having a first set of one or more network addresses which have been allocated to the network gateway, wherein a first network address of the first set of one or more network addresses is associated with an indicator that indicates participation of the network gateway in the first subnet; and deallocating one or more of the first set of network addresses from the network gateway and returning the deallocated network addresses to a first address pool associated with the first subnet.

18. The method of claim 17, further comprising:

determining that fewer network addresses than the number of network addresses specified in the deallocation request have been allocated to the network gateway from the first subnet; and in response to said determining:

determining a second subnet of the public network having a second set of one or more network addresses which have been allocated to the network gateway; and deallocating one or more of the second set of network addresses from the network gateway and returning the deallocated network addresses to a second address pool associated with the second subnet.

19. The method of claim 18, further comprising determining, before deallocating each network address from the network gateway, that the network address to be deallocated does not represent the network address of the network gateway on the public network.

20. The method of claim 18, further comprising:

determining that one of the deallocated network addresses in the second set represents participation of the network gateway in the second subnet; and associating an indicator with another network address allocated to the network gateway, the indicator indicating that the associated network address represents participation of the network gateway in the second subnet.

* * * * *